United States Patent
Kwon et al.

(10) Patent No.: US 12,462,488 B2
(45) Date of Patent: Nov. 4, 2025

(54) TRAINING SYSTEM, METHOD AND APPARATUS USING EXTENDED REALITY CONTENTS

(71) Applicant: INTERACT Co., Ltd., Incheon (KR)

(72) Inventors: NamHyeok Kwon, Incheon (KR); JuHo Hong, Incheon (KR); HyeongGeun Kim, Incheon (KR)

(73) Assignee: INTERACT Co., Ltd., Incheon (KR)

( * ) Notice: Subject to any disclaimer, the term of this patent is extended or adjusted under 35 U.S.C. 154(b) by 0 days.

(21) Appl. No.: 18/338,923

(22) Filed: Jun. 21, 2023

(65) Prior Publication Data

US 2024/0212286 A1 Jun. 27, 2024

(30) Foreign Application Priority Data

Dec. 26, 2022 (KR) .......................... 10-2022-0184988

(51) Int. Cl.
*G06T 19/00* (2011.01)
*G09B 5/02* (2006.01)

(52) U.S. Cl.
CPC .............. *G06T 19/00* (2013.01); *G09B 5/02* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2015/0260474 A1 | 9/2015 | Rublowsky et al. | |
| 2017/0304707 A1* | 10/2017 | Morton | G06N 3/006 |
| 2019/0304188 A1* | 10/2019 | Bridgeman | G09B 5/14 |
| 2021/0118240 A1* | 4/2021 | Lee | G06F 3/011 |

(Continued)

FOREIGN PATENT DOCUMENTS

| | | |
|---|---|---|
| CN | 105654806 A | 6/2016 |
| CN | 113052949 A | 6/2021 |

(Continued)

OTHER PUBLICATIONS

Matrix Game, "Game Manual WarPlan", Posted Jul. 13, 2021, https://www.matrixgames.com/amazon/PDF/WarPlan/Warplan%20manual%20printer-friendly.pdf (Year: 2021).*

(Continued)

*Primary Examiner* — Sarah Le
(74) *Attorney, Agent, or Firm* — AEON Law, PLLC; Adam L.K. Philipp; Ki O

(57) ABSTRACT

A training system, a method and an apparatus using XR contents are provided. The training system using extended reality (XR) contents, includes a first creation unit configured to create a template for creating the XR contents, receive a first image for creating the XR contents from outside, and convert the first image into a second image to be used by a second creation unit to create the XR contents, the second creation unit configured to create the XR contents, acquire the second image from the first creation unit, create the XR contents by using the second image, and create a scenario for training using the XR contents, a control unit configured to control the training system using the XR contents and control the scenario for operating the training using the XR contents, a server configured to select the scenario and register a user, and a user terminal.

8 Claims, 8 Drawing Sheets

(56) References Cited

U.S. PATENT DOCUMENTS

| | | | |
|---|---|---|---|
| 2021/0150815 A1* | 5/2021 | Ju | G06T 17/20 |
| 2022/0165024 A1 | 5/2022 | Zavesky et al. | |
| 2023/0065252 A1* | 3/2023 | Døssing | A63F 13/65 |
| 2023/0069758 A1* | 3/2023 | Rao | A63B 71/0622 |
| 2023/0169881 A1* | 6/2023 | Evans | G06F 3/013 |
| | | | 434/11 |
| 2024/0004456 A1* | 1/2024 | Todasco | G06T 13/40 |

FOREIGN PATENT DOCUMENTS

| | | | |
|---|---|---|---|
| CN | 114882177 A | | 8/2022 |
| JP | 2021086146 A | | 6/2021 |
| KR | 20180081274 | * | 7/2018 |
| KR | 1020180081274 A | | 7/2018 |
| KR | 20190042783 A | | 4/2019 |
| KR | 1020210086250 | | 7/2021 |
| KR | 102288715 | * | 8/2021 |
| KR | 102359604 B1 | | 2/2022 |
| KR | 20220097665 A | | 7/2022 |
| WO | 2004042662 A1 | | 5/2004 |
| WO | 2021231815 A1 | | 11/2021 |

OTHER PUBLICATIONS

Non-Final Office Action received for KR Patent Application No. 10-2022-0184988, mailed on Mar. 6, 2023, 14 pages (7 pages of Official copy and 7 pages of English translation).
Final Office Action received for KR Patent Application No. 10-2022-0184988, mailed on Jun. 1, 2023, 6 pages (3 pages of Official copy and 3 pages of English translation).
Non-Final Office Action received for JP Patent Application No. 2023-112201, mailed on Jul. 24, 2023, 7 pages (3 pages of Official copy and 4 pages of English translation).
Extended European Search Report received for EP Application No. 23180012.9, mailed on Nov. 24, 2023, 12 pages.
First Office Action received for CN Application No. 202310770308.3 mailed on Mar. 1, 2024, 22 pages including English translation.
GB Application No. 2117713.4, available on Jan. 19, 2022, 34 pages.

* cited by examiner (a)

(b)

TRAINING SYSTEM, METHOD AND APPARATUS USING EXTENDED REALITY CONTENTS

CROSS-REFERENCE TO RELATED APPLICATION

This application is based on and claims priority under 35 U.S.C. § 119 to Korean Patent Application No. 10-2022-0184988, filed on Dec. 26, 2022, in the Korean Intellectual Property Office, the disclosure of which is incorporated by reference herein in its entirety.

TECHNICAL FIELD

The disclosure relates to a training system, a method and an apparatus using extended reality (XR) contents, and more particularly, to a system, a method, and an apparatus for creating contents for training like a real situation using XR contents.

BACKGROUND

Virtual reality (VR) technology provides only computer graphics (CG) images of objects or backgrounds in the real world, augmented reality (AR) technology provides virtual CG images over real object images, and mixed reality (MR) technology is computer graphic technology that mixes and combines virtual objects with the real world. All of the VR, AR, MR, and so on are simply referred to as extended reality (XR) technology.

In particular, a device to which AR technology is applied recognizes real spaces and real objects in three dimensions through a camera and displays the real spaces and virtual objects on a screen. However, according to the conventional art, the virtual objects could be moved only based on a user's touch recognized on the screen.

Virtual reality basically provides visual stimuli and auditory stimuli to users and has a limit to stimulate the other senses. There may not be many cases where olfactory stimuli and taste stimuli are required in the context of training and entertainment, but cases where tactile stimuli are required occur relatively frequently. For example, when an object or a structure is visually simulated in virtual reality, a user may want to hold the object or lean on the structure, but the object or the structure does not exist in the real environment, and accordingly, accidents, such as confusion or falling may occur.

In particular, when training is performed through virtual reality, interaction with surrounding structures may be a major part of the training. For example, when anti-terrorism training is performed using virtual reality, using a structure as means of concealment or defense by leaning behind the structure, such as a wall, may be a large part of a trainee's training. In this case, when the virtual reality is provided only as an audio-visual stimuli, the trainee may not interact with the structure, and accordingly, completion of the training is inevitably reduced.

The description set forth in the background section should not be assumed to be prior art merely because it is set forth in the background section. The background section may describe aspects or embodiments of the disclosure.

SUMMARY

Aspects of the disclosure provide a training system, a training method, and a training apparatus using XR contents.

Aspects of the disclosure provide a method, an apparatus, and a system for creating XR contents to obtain a realistic training effect.

According to some aspects of the disclosure, a training system using extended reality (XR) contents, includes a first creation unit configured to create a template for creating the XR contents, receive a first image for creating the XR contents from outside, and convert the first image into a second image to be used by a second creation unit to create the XR contents, the second creation unit configured to create the XR contents, acquire the second image from the first creation unit, create the XR contents using the second image, and create a scenario for training using the XR contents, a control unit configured to control the training system using the XR contents and control the scenario for operating the training using the XR contents, a server configured to select the scenario and register at least one user, and a user terminal configured to provide the training system using the XR contents to the at least one user.

According to some aspects, the first creation unit converts the first image into the second image having a standardized format and/or a standardized size to be used by the second creation unit.

According to some aspects, the first creation unit causes the second image to have at least one parameter according to type of property in the XR contents.

According to some aspects, number and type of the at least one parameter depend on type of the second image.

According to some aspects, the second image is provided to the second creation unit in a form of library according to type of property in the XR contents.

According to some aspects, the second creation unit configures, in the XR contents, a map in which the scenario is executed and a training space which is played by the at least one user, at least one object and at least one asset are arranged in the map and the training space, and at least one of the at least one object or the at least one asset is activated for the training when a preset condition is satisfied.

According to some aspects, the scenario includes at least one mission for determining success or failure of the scenario, and each of the at least one mission includes at least one goal for determining success or failure of each of the at least one mission.

According to some aspects, when each of the at least one mission includes at least two goals, each of the at least one mission is determined to be successful if all the at least two goals are satisfied.

According to some aspects, the scenario further includes at least one event dependent on or independent of the at least one mission, and the at least one independent event is activated based on at least one of an interaction between the at least one user and an object and/or an asset or a position of the at least one user in virtual reality.

According to some aspects of the disclosure, a method of creating XR contents for training, includes receiving a first image for creating the XR contents, converting, by a first creation unit, the first image into a second image to be used by a second creation unit for creating the XR contents, and creating the XR contents using the second image, wherein the first creation unit converts the first image into the second image having a standardized format and/or a standardized size to be used by the second creation unit.

Aspects of the disclosure are not limited to those described above, and other objects and advantages of the disclosure not described above may be understood by following descriptions and will be more clearly understood by embodiments of the disclosure. It will also be readily apparent that objects and advantages of the disclosure may be realized by means of instrumentalities and combinations represented in claims.

A training system using XR contents according to some embodiments of the disclosure may obtain various training effects in limited environment and space by using realistic XR contents.

In addition, the disclosure creates various XR contents and performs training using the created XR contents, and thus, an effect of collecting various types of data according to each environment and condition of a user may be obtained.

The above and other aspects, features, and advantages of certain embodiments of the disclosure will be more apparent from the following description taken in conjunction with the accompanying drawings.

DETAILED DESCRIPTION OF THE PREFERRED EMBODIMENTS

Figure 1:
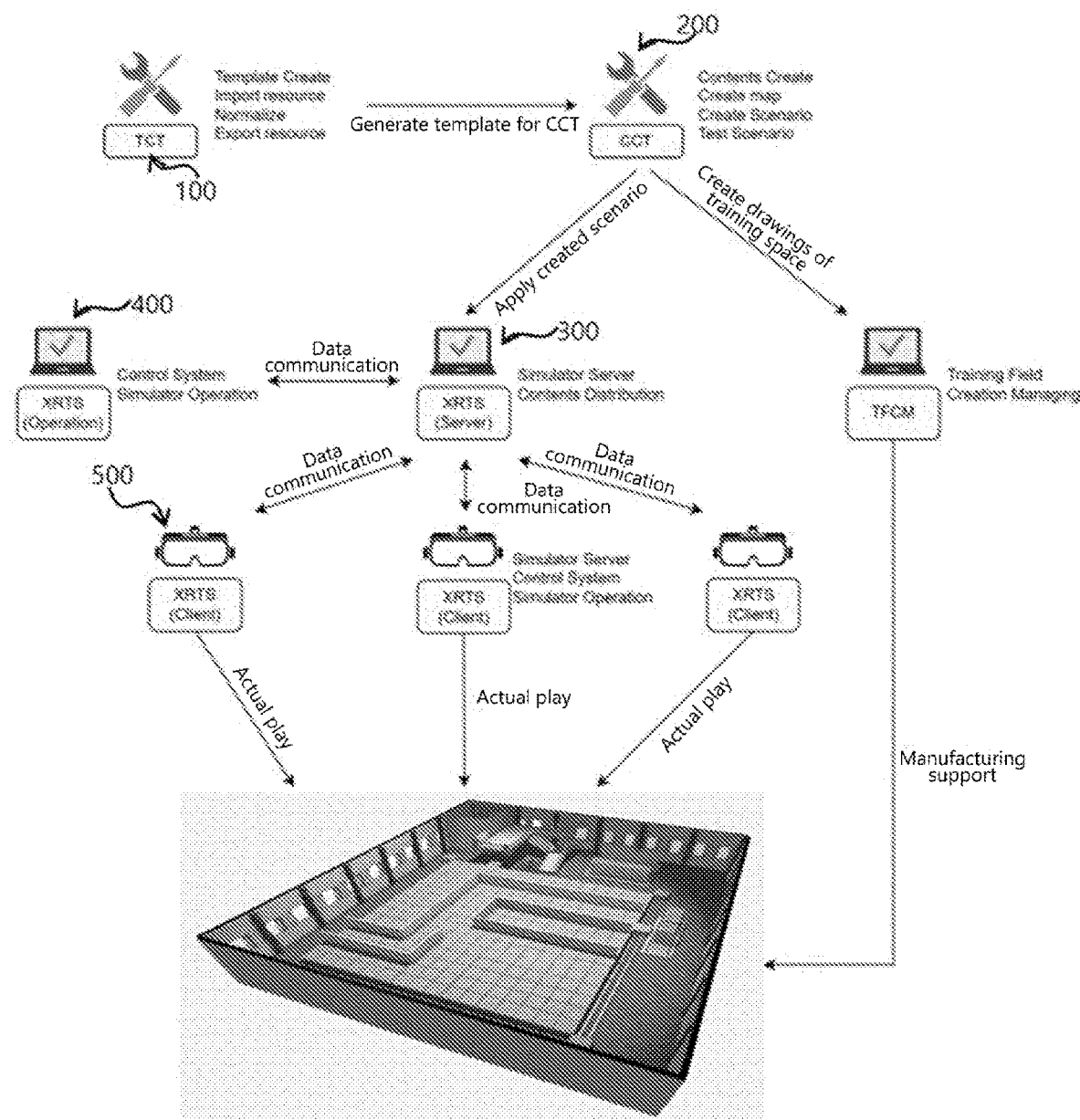
FIG. 1 illustrates an example of a system for creating extended reality (XR) contents according to an embodiment of the disclosure.
Figure 2:
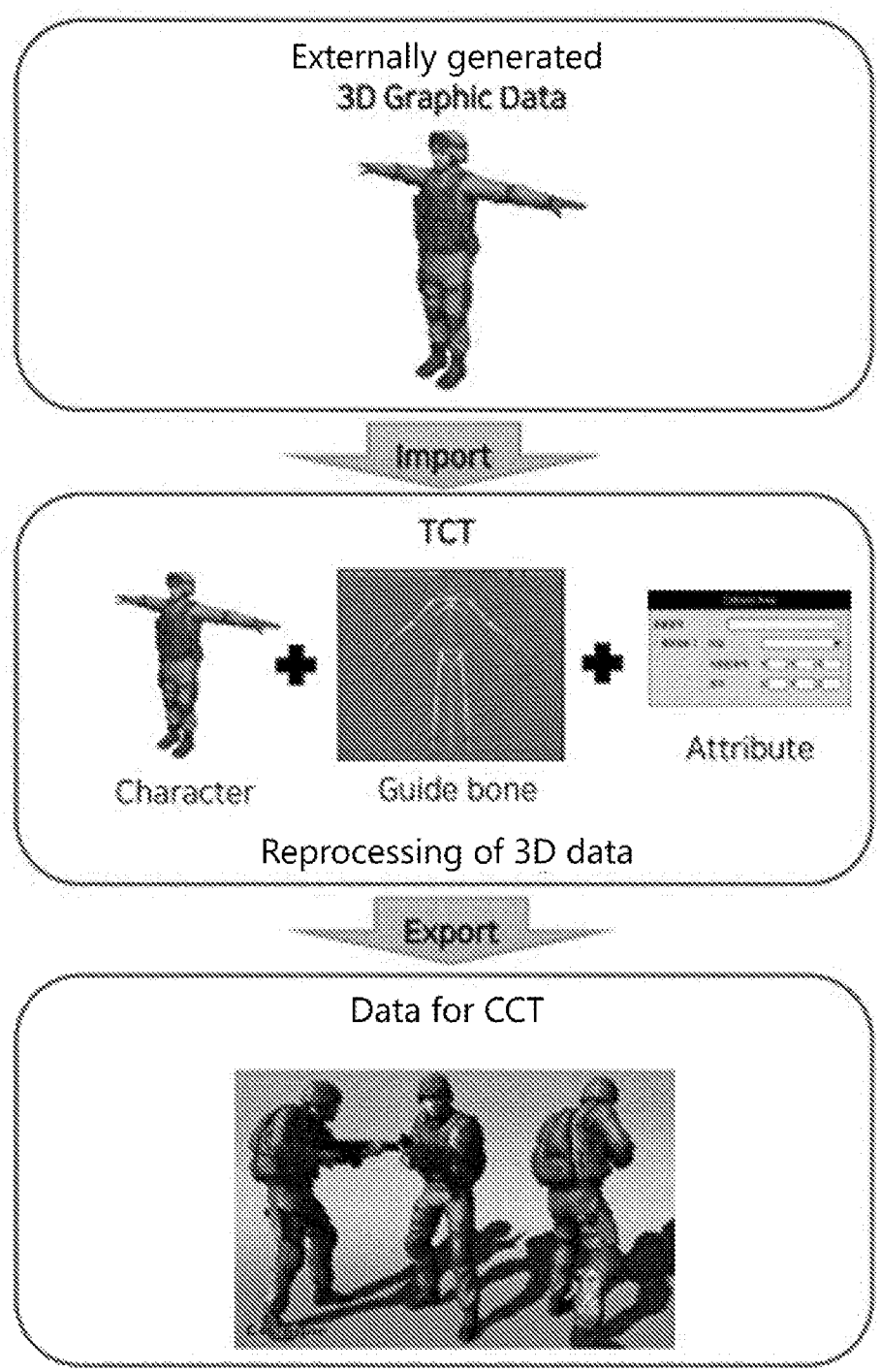
FIGS. 2 to 5 illustrate examples of an image generation method using a template create tool (TCT) for creating XR contents, according to an embodiment of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

FIG. 1 illustrates an example of a system for creating extended reality (XR) contents, according to an embodiment of the disclosure.

XR is a term including virtual reality (VR), augmented reality (AR) and a mixed reality (MR) technology that includes VR and AR.

While VR is a technology for allowing users to experience a new reality based on 360-degree images, AR displays information and contents through computer graphics (CG) over real objects. Although AR and VR are separate from each other, these two technologies complement each other's shortcomings and are mutually evolving. However, at this stage, a difference therebetween are evident. VR requires a headset type terminal (i.e., head mounted display (HMD)) that covers both eyes completely, and AR may be implemented with glasses, such as Google Glass.

XR creates an expanded reality by freely choosing individual use or mixed use of virtual and augmented reality (VR and AR) technologies. HoloLens developed by the Microsoft (MS) is a device in a form of glasses and may be seen as a form of XR in that the HoloLens displays optimized three-dimensional (3D) holograms by obtaining information of real space and object.

If XR technology evolves, glasses are usually transparent, but when AR is required, the glasses may display information. When VR is required, the glasses may become opaque and allow information to be displayed completely through the entire visual field.

XR is expected to be applied to various fields, such as education, healthcare, manufacturing, etc. In order to realize XR, high-performance computing power and graphic processing performance are required to display large-capacity real-time 3D images. Also, display technology has to be developed, and a technology for transmitting large amounts of data with ultra-low latency and high efficiency, such as fifth generation (5G) mobile communication, is also a prerequisite.

When training is performed by creating training contents using XR contents, a training environment may be created virtually without creating an actual training environment, and accordingly, various contents for training may be created in a limited space. In addition, by performing training using these various contents, training may be performed using various contents according to the purpose of training.

Referring to FIG. 1, a training system using the XR contents includes a template create tool (TCT) 100, a content create tool (CCT) 200, an XR training system (XRTS) server 300, an XRTS operation 400, a plurality of XRTS clients 500, and training field creation managing (TFCM).

The TCT 100 is a tool for creating templates for creating XR contents for training. The TCT 100 may import a graphic resource (for example, two-dimensional (2D) or 3D images, etc.) which is generated externally and convert the graphic resource into an image usable in the CCT 200 for creating XR contents. Hereinafter, in the disclosure, TCT may be referred to as a first creation unit.

Specifically, the TCT 100 may convert 2D or 3D data generated externally (a first image) into standardized 2D or 3D data, read the standardized 2D or 3D data, convert format and size of the read image to be used in the CCT 200, and store the image (a second image).

In this case, a plurality of attribute values (or parameters) may be added to the 2D or 3D data and stored according to property of the data (or property of the image) so that the converted 2D or 3D data may be used to create XR contents in the CCT 200. For example, when the TCT 100 imports a 3D image generated externally, the imported 3D image may be imported as a standardized 3D image, and a format and a size of the imported 3D image may be changed to be used by the CCT 200 to create XR contents. Also, depending on the property of the 3D image (for example, the image is a character, a thing, an object, or an item), the 3D image may have one or more attribute values (for example, a collision area, a size, animation, interaction, event, and so on) added thereto and stored.

In this case, type and number of attribute values added to the converted data may change depending on the property of the data.

The CCT 200 is a tool for creating various XR contents using data generated or created by resource create tool (RCT) or the TCT 100. The CCT 200 may configure a map in an XR content for training using walls and may configure a training space using various objects or assets. In the disclosure, the CCT 200 may be referred to as a second creation unit.

The map may indicate a basic map in training using XR contents and may be created by arranging walls created by RCT or TCT 100 through linkage with a training center.

A space for training (hereinafter, referred to as a training space) may be provided in a map, objects and/or assets created by the TCT 100 and registered in a library may be placed in the created map, and users may play XR contents through the created training space using an XRTS client 500.

In addition, the CCT 200 may create mission for scenario progression of training and may also create events for mission performance. In this case, the events may be created through interactions with the objects and/or the assets.

A plurality of missions may exist in one XR content, and each mission may not be related to each other or may be related to each other, and accordingly, a next mission may be performed only when a preset mission is performed. That is, the plurality of missions included in the XR contents may be related to each other in time-series or may be configured in a parallel structure independent of each other. When the plurality of missions are configured in a parallel configuration, each mission may have an independent creation condition, several missions may be created simultaneously when the creation condition is satisfied, and execution orders of the plurality of missions are not related to each other.

A scenario may have a plurality of missions, and each mission may have one or more goals. When a preset condition is satisfied, each goal of the missions may be determined to be successful. For example, a goal may include at least one of a state condition that is affected by a state of a player performing XR contents, a state of a structure, and/or a state of an environment, a time condition in which the goal has to be accomplished within a time limit, or an action condition under which a preset action has to be performed. In this case, each goal may be determined to be successful only when all conditions included in the goal are satisfied. For example, the state condition may be determined to be successful when a preset target state is reached, and may be immediately determined to be failed at a point in time when the target state cannot be reached. In addition, the time condition may be determined to be successful when the goal is achieved within a time limit, and may be determined to be failed when the time limit is exceeded. In addition, the action condition may be determined to be success when a preset action is performed, and may be immediately determined to be failed at a point in time when the preset action cannot be performed.

When a scenario has a plurality of missions, whether the scenario is successful may be determined according to whether all missions are successful, and each mission may include a plurality of goals.

Also, the scenario may include a plurality of events. Each of the plurality of events may mean any phenomenon that occurs during training. For example, the plurality of events may mean all situations that occur according to or regardless of a training process, such as appearance of a non-player character (NPC) or destruction of an object.

Each event may include three stages of creation condition, event processing, and event end. The creation condition may be set to various state values similar to mission, and an event may be created when a corresponding state is satisfied during playing of XR contents. The event processing means changing a state of an object or a region in which an event is registered. For example, the event processing may indicate a fire on an object, gas contamination in a region, movement or death of a preset NPC, and so on.

The event may end when all processes registered in the event processing are performed. The event may be created in a region set by an object (for example, NPC, an object, etc.) placed in the map and a tool, and detailed information of the created event may be displayed when the object is selected. The event may be checked both in a map view and in an event view of XR contents.

The events may include object events performed through interactions with objects and region events performed in preset regions.

The XRTS server 300 may indicate a server for performing training using XR contents in reality, and may select a scenario for training and register participants. Hereinafter, in the disclosure, the XRTS server 300 may be referred to as a server.

The XRTS operation 400 is a system for actual training operation and may indicate an integrated management system that includes scenario operation, client management, and control mode. Hereinafter, in the disclosure, the XRTS Operation 400 may be referred to as a control unit.

Specifically, the XRTS Operation 400 is a system for training operation, and may control delivery of instructions to a plurality of devices of users (i.e., the plurality of XRTS clients 500), start/end of training, and pause of training.

In addition, the XRTS operation 400 may collect and monitor data obtained from training performed by users from each XRTS client 500, and set a grade to each mission or scenario according to the collected data when each mission or scenario is successful, and store the data of each of the plurality of XRTS clients 500. For example, the XRTS operation 400 may collect data on action (for example, a number of killed enemies, achieved goals, a number of successful missions, and difficulty) performed by a user through playing using XR contents, set grades (for example, grades from S to D or grades from 1 to 7) for each mission based on the collected data, transmit the grades to the plurality of XRTS clients 500, and output the grades to the user.

The plurality of XR clients 500 may be connected to the XRTS server 300 to provide the XR contents to the user such that the user may play the XR contents. In this case, the XR contents provided to the user may be provided within the training space. Hereinafter, in the disclosure, the plurality of XR clients 500 may be referred to as user terminals.

Hereinafter, procedures performed by each device are described in detail.

FIGS. 2 to 5 illustrate examples of an image generation method using the TCT for creating XR contents, according to an embodiment of the disclosure.

Referring to FIGS. 2 to 5, the TCT 100 may standardize externally generated data (for example, 2D or 3D images), convert the data into usable data in the CCT 200, and store the usable data. In this case, the converted and stored data may be stored in a library format.

Figure 3:
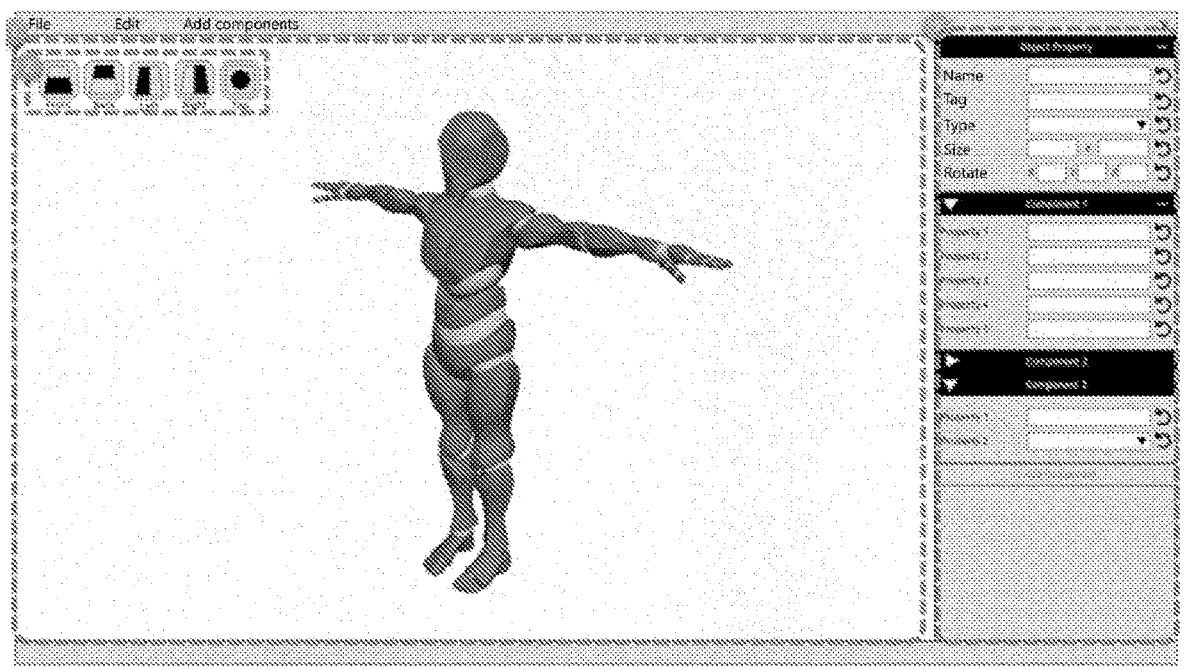

Specifically, as illustrated in FIG. 3, the TCT 100 may import the externally generated data, and convert the imported data into standardized data and read the standardized data.

The read data may be changed in format and size to be used for creating XR contents by the CCT 200, and one or more attribute values or parameters may be added and stored according to property of the data.

For example, the plurality of attribute values (or parameters) may be added to 2D or 3D data according to the property of the data (or property of an image) and stored such that the converted 2D or 3D data may be used to create XR contents. For example, when the TCT 100 imports a 3D image externally generated, the imported 3D image may be imported as a standardized 3D image, and the imported 3D image may be changed in format and size so as to be used for creating XR contents by the CCT 200. Also, according to the property of the 3D image (for example, the 3D image is a character, a thing, an object, or an item), the 3D image may be stored including one or more attribute values (for example, a collision area, a size, animation, interaction, an event, and so on).

In this case, type and number of attribute values added to the converted data may change according to the property of the data.

In addition, the read data may be modified according to information of registered users and/or users participating in training and stored separately for each user. Specifically, individual additional parameters may be added to the read data according to nationality, performance of previously participated training, gender, goal, and/or age of a registered user and/or a user participating in training, and stored for each registered user. For example, when the nationality of the registered user and/or the user participating in training is a specific country, the data used for training of the user may be replaced with modified images based on images and data related to nationality in competition or hostile relationship with the nationality of the user. In this case, data of the nationality in hostile relationship may include images of the country, images of data (for example, images of guns, military uniforms, buildings, and so on) used in the country, and individual additional parameters may be added to the data obtained based on average data (for example, average body data of soldiers, firearms, and performance of weapons (for example, combat planes, tanks, and so on)) of the country and stored individually for registered users and/or users participating in training so as to be used for training of the user. Alternatively, individual additional parameters may be added to the read data based on previous training performance and stored for each registered user. For example, when the user obtained certain performance or higher in the previous training, additional parameters (for example, a reaction speed, collision area adjustment, detection range expansion, cooperation through mutual interactions with other objects, and so on) may be added to data of objects used for the user's training based thereon and stored.

The converted data may be stored in a library format and provided to the CCT 200.

Figure 4:
Figure 4:
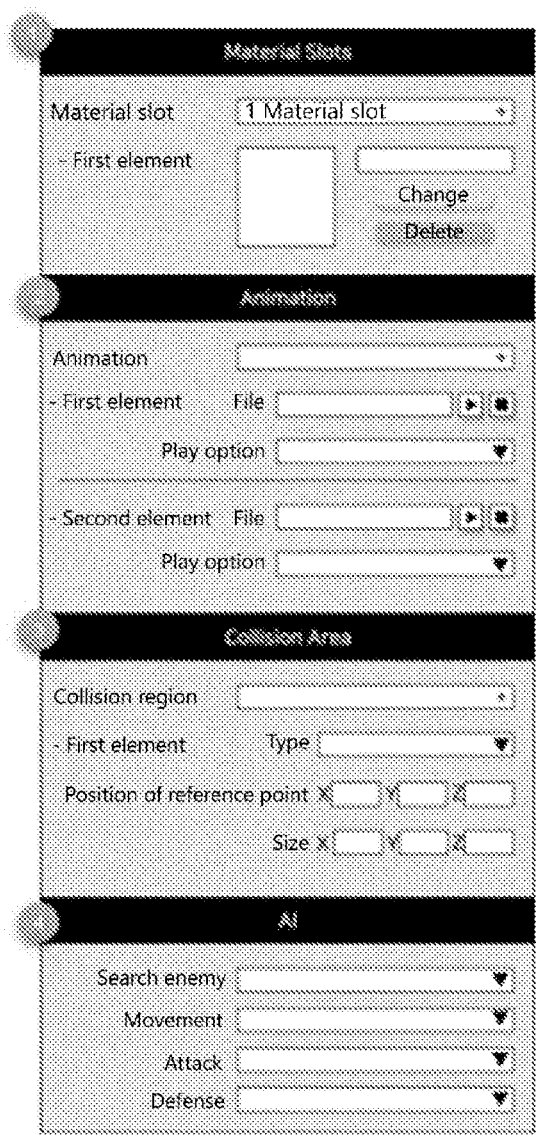

Examples of a screen on which the TCT 100 may modify the data are illustrated in FIGS. 3 and 4. Referring to FIG. 4, when the externally generated data is imported as standardized data, an image of the imported data may be modified. In this case, a basic screen of the TCT 100 may include ① a view port region ② a camera preset button region, and ③ a detailed item display region.

The view port region ① is a region where a 2D or 3D object imported and standardized is visualized, and the camera preset button region ② is a region where basic setting position buttons of a camera are placed. When each image in the camera preset button region is clicked, the camera is moved to a camera position corresponding to the image. That is, when a Front image is clicked, an image of an object obtained by imaging the 3D object from the front is displayed in the view port region. That is, each button in the camera preset button region indicates an imaging position of an image to be displayed in the view point region. The detailed item display region ③ indicates a region where properties and components of the objects appearing in the view point region area are displayed. Properties and values of the components and properties and values of the object may be displayed in the detailed item display region.

When the property or type of the image is a character type as illustrated in FIG. 4, an output screen of the TCT 100 for modifying the image may include a material region, animation region, a collision area region, and artificial intelligence (AI) region. The material region is a region for determining whether to use material of the image read through import, and the animation region is a region for determining whether to apply basically provided animation as it is. The collision area (i.e., a collision box) region is a region for setting an area where a collision with a character may occur, and may be provided in various forms, such as a box or a capsule. The character may interact through the collision area region. That is, it may be determined that a collision with the character occurs only when a certain motion is included in the collision area. The AI region is a region for setting AI patterns for an NPC, and four motions of search, movement, attack, and/or defense may be set. In this case, a setting value of the AI region is set as a default value and may be modified by the CCT 200.

Through the method described above, various attribute values and/or parameter values may be added to be used by the CCT 200 using externally generated image data imported through the TCT 100.

A number and type of the attribute values and/or parameter values may change depending on the type of images (a character, a vehicle, general, a wall, a gun, a floor, etc.).

Figure 5:
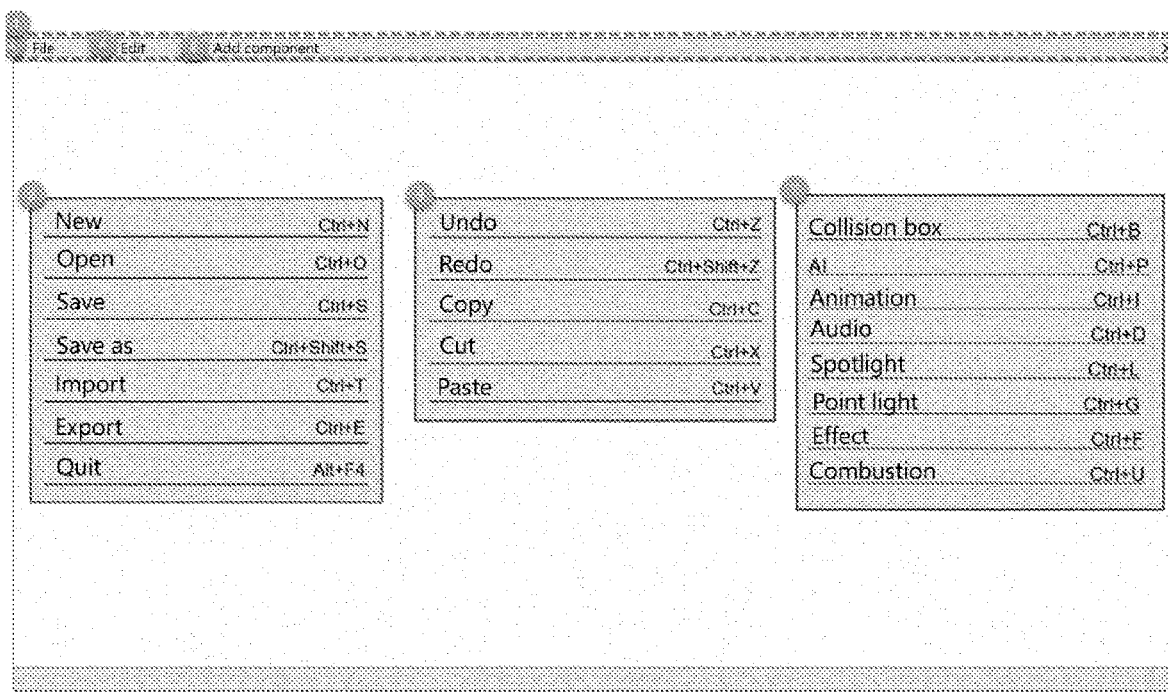

FIG. 5 illustrates a top menu bar of the TCT 100 and each detailed menu. The top menu bar of the TCT 100 may include a top bar region, a file menu, a region showing submenus of the file menu, an edit menu, submenus of the edit menu, a component addition menu, and submenus of the component addition menu.

Figure 6:
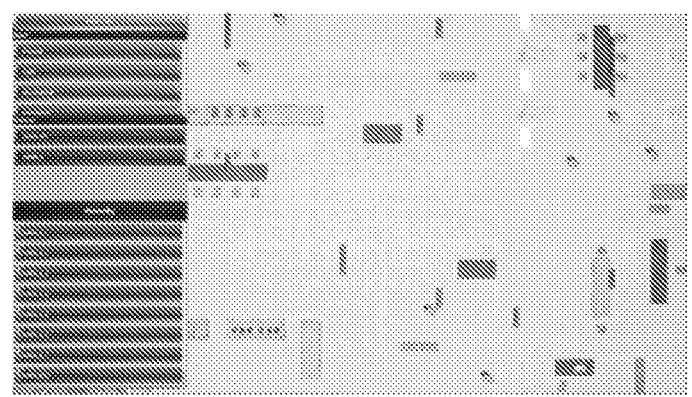
FIGS. 6 and 7 illustrate examples of an image generation method using Contents Create Tool (CCT) for creating XR contents, according to an embodiment of the disclosure.
Figure 6:
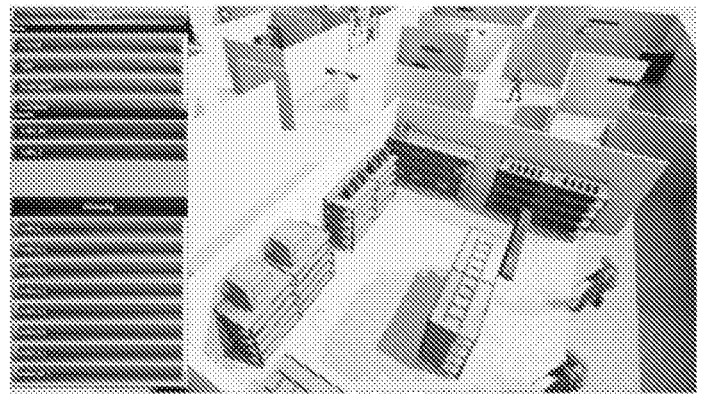
Figure 7:
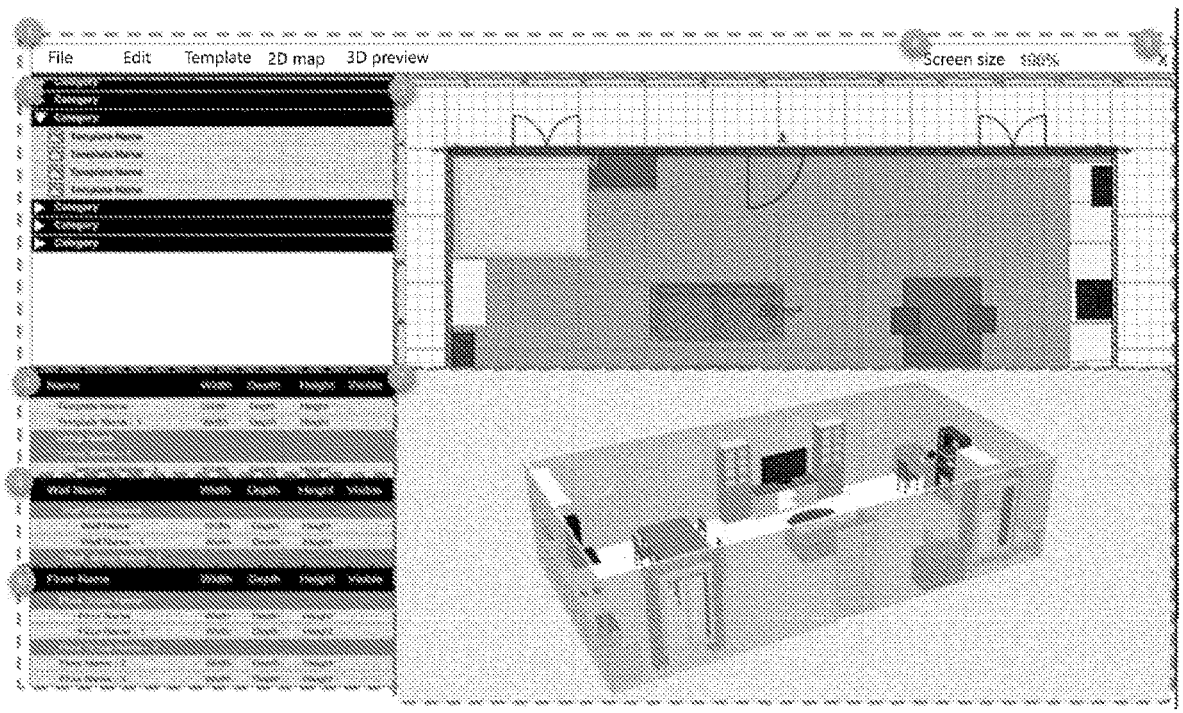

FIGS. 6 and 7 illustrate examples of an image generation method using a CCT for creating XR contents, according to an embodiment of the disclosure.

Referring to FIGS. 6 and 7, data converted through a TCT may be used to create XR contents through the CCT, and XR contents for training may be created by the CCT.

Specifically, the CCT may be a tool for creating XR contents and create various contents using data generated by an RCT and/or the TCT (for example, 2D or 3D data). In addition, the CCT may configure a map of the XR contents using walls, or a training space for training using objects or assets. In addition, scenarios, missions, and events may be created and arranged for training through XR contents.

In addition, when data transmitted from the TCT cannot be used for the CCT or a preset map, the data may be transmitted through reprocessing to the TCT by the CCT, and after the TCT determines why the data transmitted from the CCT cannot be used, the corresponding part that cannot be used may be corrected and re-transmitted to the CCT. For example, if a setting value of a preset format cannot be used by the CCT, the CCT may transmit why the format cannot be used to the TCT, and the TCT may correct the format and retransmit the format to the CCT. Alternatively, if the format cannot be used for a preset map (or with a preset object, etc.), the CCT may report the map (or a reason why the format cannot be interacted with the preset object, etc.) that cannot be used to the TCT, and the TCT may correct the format of the object to be usable in the map (or the preset object, etc.) and transmit the corrected object to the CCT. In this case, the corrected object may be transmitted to a library with the map (or the preset object) so as to be used only in the map (or the preset object, etc.), or the CCT may store the corrected object together with the map (or the preset object, etc.).

Arranged objects may be set such that training is performed through interactions with other objects. Specifically, while a user performs training through the XRTS client 500, a preset object (for example, a hostile NPC, an enemy soldier, a hostile creature, etc.) may be set to perform interactions with various objects arranged on the map (for example, discovery through a mirror, sound of footsteps, and so on), and accordingly, difficulty of training may be increased. For example, a preset object (for example, an enemy soldier) may find a user through a mirror, a fluoroscope, etc. placed on the map in addition to directly finding the user in a collision area or a field of view, and may also find the user through sound of the user stepping on a nearby object, sound of footsteps that increases, and so on.

Such an increase in difficulty may be individually set for each object or may be collectively increased in accordance with a difficulty setting. When the difficulty is individually increased, the difficulty setting for each object may be made through various types of individual setting (for example, only a preset NPC finds a user through a mirror or footsteps, and so on, or interaction with a preset object is set, and so on) for each object. When the difficulty is increased in batches, each object is set for batch difficulty setting, and the difficulty setting may be made step by step through the batch difficulty setting. For example, when the batch difficulty setting is a preset level, the object may be previously set to become preset setting according to the preset corresponding difficulty level.

As illustrated in (a) of FIG. 6, a map of XR contents for training may be configured through the CCT. The map may indicate a basic map for training using XR contents and may be created by arranging walls created by an RCT or a TCT through linkage with a training center.

In addition, as illustrated in (b) of FIG. 6, a training space may be configured by arranging objects and assets of a library created and registered by the TCT on the created map. In this case, the training space may indicate a space where the user play XR contents through the XRTS client 500. Various events may be arranged and scenarios may be created and added to the training space of the map.

Hereinafter, terms used in the scenario may be defined as follows.

A scenario is defined as a whole process that is performed during training, and a goal of training is to achieve a goal of the scenario.

A mission may indicate an intermediate step that has to be taken to proceed with a scenario. A scenario may include one or more missions.

An event may indicate individual processing included in a mission. An event may be divided into two categories of an object event that occurs in an object and a region event that occurs in a region. A mission may include one or more events.

An object event may indicate an event that is based on an object. An object event may depend on a set object and affect the object on which the object event depends.

A region event may indicate an event that is based on a region. A region event may depend on a set region and affect a region on which the region event depends.

A scenario may create missions for progressing the scenario and may also create events for performing the missions. In this case, the events may occur through interaction with objects and/or assets.

A plurality of missions may be included in one XR content, and each mission may not be related to each other or may be related to each other, and accordingly, next mission may be performed only when a preset mission is performed. That is, the plurality of missions included in the XR contents may be configured in time-series or in parallel structures independent of each other. When the plurality of missions are configured in the parallel structures, each mission may have an independent occurrence condition, and if the occurrence condition is satisfied, several missions may occur simultaneously, and a performance sequence of the several missions may not be related to each other.

A scenario may have a plurality of missions, and each mission may have one or more goals. When a preset condition is satisfied, each goal of the missions may be determined to be successful. For example, a goal may include at least one of a state condition that is affected by a state of a player performing XR contents, a state of a structure and/or an environment state, a time condition in which a goal has to be accomplished within a time limit or an action condition under which a preset action has to be performed. In this case, each goal may be determined to be successful only when all conditions included in the goal are satisfied. For example, the state condition may be determined to be successful when a preset target state is reached, and may be immediately determined to be failed at a point in time when the target state cannot be reached. In addition, the time condition may be determined to be successful when the goal is achieved within a time limit and may be determined to be failed when the time limit is exceeded. In addition, the action condition may be determined to be successful when a preset action is performed, and may be immediately determined to be failed at a point in time when the preset action cannot be performed.

When a scenario has a plurality of missions, whether the scenario is successful may be determined according to whether all missions are successful, and each mission may include a plurality of goals.

Also, the scenario may include a plurality of events. Each of the plurality of events may indicate any phenomenon that occurs during training. For example, the plurality of events may indicate all situations that occur according to or regardless of a training process, such as appearance of an NPC or destruction of an object.

Each event may include three stages of creation condition, event processing, and event end. The creation condition may be set to various state values similar to mission, and an event may be created when a corresponding state is satisfied during playing of XR contents. The event processing may indicate changing a state of an object or a region in which the event is registered. For example, the event processing may indicate a fire on an object, gas contamination in a region, movement or death of a preset NPC, and so on.

The event may end when all processes registered in the event processing are performed. The event may occur in a region set by an object (for example, an NPC, an object, etc.) placed on a map and a tool, and detailed information of the created event may be displayed when the object is selected. The event may be checked both in a map view and in an event view of XR contents.

The events may include object events performed through interactions with objects and region events performed in preset regions.

Figure 8:
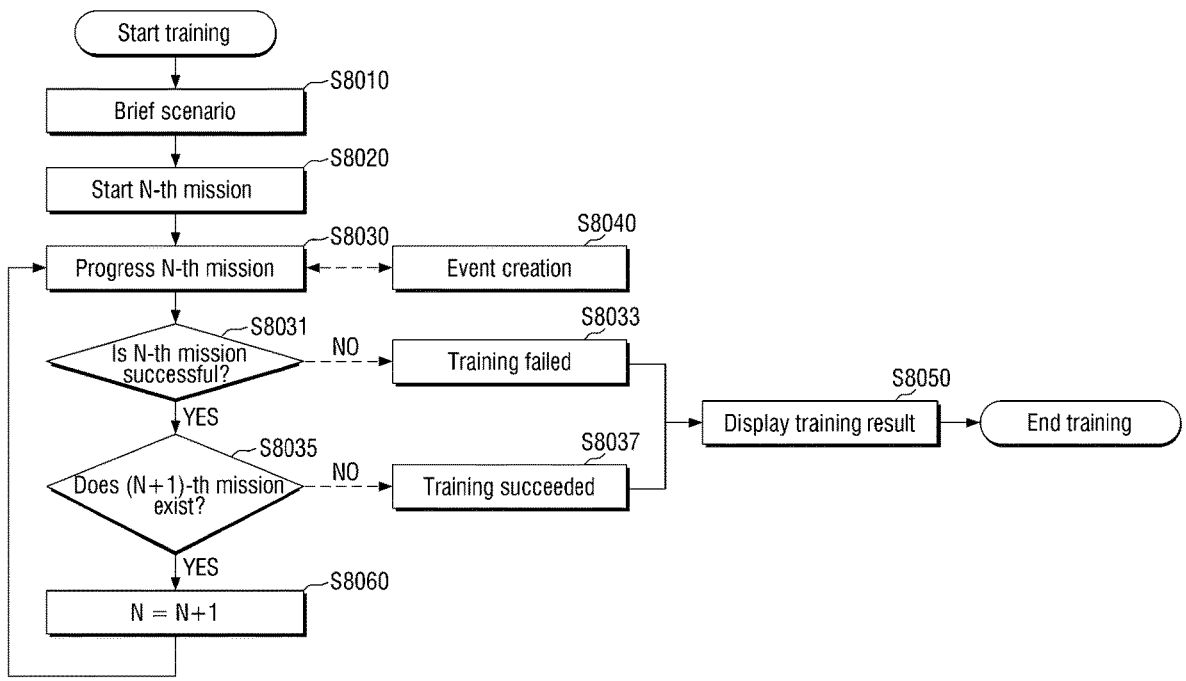
FIG. 8 is a flowchart illustrating training using a scenario created through XR contents, according to an embodiment of the disclosure.

FIG. 8 is a flowchart illustrating training using a scenario created through XR contents, according to an embodiment of the disclosure.

First, when a scenario of the created XR contents starts, the scenario is briefed through an XRTS operation at S8010, and an N-th mission starts at S8020. In this case, N starts from 1, and when the mission has a parallel construction rather than a serial construction, a plurality of missions may start according to whether a player satisfies a condition.

Thereafter, the N-th mission is proceeded at S8030, and events occur according to interactions between the player and the objects at S8040. An event may also occur by an interaction with an NPC in simple XR contents, and an event that has a significant impact on a mission may occur. An event related to success of mission may be related to a goal of the mission, and the success of the mission may be changed according to whether the goal is achieved. When there are a plurality of goals, all the goals have to be satisfied to complete the mission.

When the N-th mission is failed at S8031, the training ends in failure at S8033, and training results are displayed based on missions that are successful up to this point in time at S8050. Training results may appear based on the missions and goals that a player succeeded within the scenario of XR contents, and may be displayed as a grade.

After the N-th mission succeeded at 8031, when there is no subsequent mission at S8035, the training is determined to be successful at S8037, and the training results may be displayed at S8050. However, when there is any subsequent mission, an (N+1)-th mission is performed at S8060.

A training system, a method, and an apparatus using XR contents, according to the embodiments described above, may be at least partially implemented by a computer program and recorded on a computer-readable recording medium. The computer-readable recording medium in which a program for performing an operation using a system for creating the XR contents is recorded, according to the embodiments, may include all types of recording devices in which data readable by a computer is stored. For example, the computer-readable recording medium may include a flash memory type memory, a hard disk type memory, a multimedia card micro type memory, a card-type memory (for example, a secure digital (SD) memory or an extreme digital (XD) memory, and so on), a random access memory (RAM), a read-only memory (ROM), and so on. In addition, the computer-readable recording medium may be distributed in a computer system connected thereto through a network, and computer-readable codes may be stored and implemented in a distributed manner. In addition, a functional programs, codes, and code segments for implementing the embodiments may be easily understood by those skilled in the art to which the embodiments belong. A computer program may include a command set that may be executed by the above-described computer, and a name thereof may be changed depending on the type of the computer. For example, when the computer is a smartphone, the computer program may be referred to as an application or an app.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of creating extended reality (XR) contents for training, comprising:
    creating a first creation unit configured to create a template for creating the XR contents, receiving a first image for creating the XR contents from outside, and converting the first image into a second image having a standardized format and/or a standardized size to be used by a second creation unit to create the XR contents;
    creating the second creation unit configured to create the XR contents, acquiring the second image from the first creation unit, creating the XR contents using the second image, and creating a scenario for training using the XR contents, wherein the scenario for training is based on a real-world environment and includes a plurality of missions and events;
    and wherein a control unit is configured to control the training system using the XR contents and control the scenario for operating the training using the XR contents, and wherein the control unit is further configured to enable remote subject matter experts to engage in the training; and wherein a server is configured to select the scenario, and register at least one user, the XR contents having one or more attribute values of one or more of the following subset of attribute values: a collision area, a size, animation, interaction, and event; and wherein a user terminal is configured to provide the training system using the XR contents to the at least one user, and wherein the user terminal comprises a head mounted display (HMD) for presenting the XR contents to the at least one user, and wherein the first creation unit is further configured to: store said one or more attribute values to the second image according to a property of the second image, and store additional parameters per the at least one user to the second image according to information of the at least one user respectively, wherein the additional parameters comprise images of a country having a hostile relationship to a nationality of the at least one user and average data of the country of the hostile relationship, and the additional parameters are stored in objects used in the training of the at least one user.

2. The method of claim 1, wherein the first creation unit causes the second image to have at least one parameter according to a type of property in the XR contents.

3. The method of claim 2, wherein a number and type of the at least one parameter depends on type of the second image.

4. The method of claim 1, wherein the second image is provided to the second creation unit in a form of a library according to the type of property in the XR contents.

5. The method of claim 1, wherein the second creation unit configures, in the XR contents, a map in which the scenario is executed and a training space which is played by the at least one user, at least one object and at least one asset are arranged in the map and the training space, and at least one of the at least one object or the at least one asset is activated for the training when preset condition is satisfied.

6. The method of claim 1, wherein the scenario includes at least one mission for determining success or failure of the scenario, and each of the at least one mission includes at least one goal for determining success or failure of each of the at least one mission.

7. The method of claim 6, wherein when each of the at least one mission includes at least two goals, each of the at least one mission is determined to be successful if all the at least two goals are satisfied.

8. The method of claim 6, wherein the scenario further includes at least one event dependent on or independent of the at least one mission, and the at least one independent event is activated based on at least one of an interaction between the at least one user and an object and/or an asset or a position of the at least one user in virtual reality.

* * * * *